(12) United States Patent
Nakamura

(10) Patent No.: US 9,519,660 B2
(45) Date of Patent: Dec. 13, 2016

(54) INFORMATION PROCESSING APPARATUS, CLUSTERING METHOD, AND RECORDING MEDIUM STORING CLUSTERING PROGRAM

(71) Applicant: Satoshi Nakamura, Kanagawa (JP)

(72) Inventor: Satoshi Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 313 days.

(21) Appl. No.: 14/064,484

(22) Filed: Oct. 28, 2013

(65) Prior Publication Data

US 2014/0149412 A1 May 29, 2014

(30) Foreign Application Priority Data

Nov. 26, 2012 (JP) ................................ 2012-257203
Jun. 7, 2013 (JP) ................................ 2013-120922

(51) Int. Cl.
*G06F 17/30* (2006.01)
*G06K 9/62* (2006.01)
*G06K 9/00* (2006.01)

(52) U.S. Cl.
CPC ..... *G06F 17/30247* (2013.01); *G06F 17/3071* (2013.01); *G06K 9/00684* (2013.01); *G06K 9/6223* (2013.01); *G06K 9/6272* (2013.01)

(58) Field of Classification Search
CPC .................... G06F 17/3071; G06F 17/30247
See application file for complete search history.

(56) References Cited

U.S. PATENT DOCUMENTS

| | | | | |
|---|---|---|---|---|
| 5,983,237 | A | * | 11/1999 | Jain .................... G06F 17/30256 |
| 2002/0065460 | A1 | * | 5/2002 | Murao .................. G06F 19/321 600/425 |
| 2003/0004966 | A1 | * | 1/2003 | Bolle ................ G06F 17/30253 |
| 2003/0018652 | A1 | * | 1/2003 | Heckerman ........ G06F 17/30713 |
| 2003/0037010 | A1 | * | 2/2003 | Schmelzer ........ G06F 17/30026 705/67 |
| 2004/0073537 | A1 | * | 4/2004 | Thiesson ................. G06F 17/18 |
| 2007/0255684 | A1 | * | 11/2007 | Chakrabarti ......... G06K 9/6218 |
| 2008/0292196 | A1 | * | 11/2008 | Jain .................. G06F 17/30265 382/225 |
| 2009/0116690 | A1 | | 5/2009 | Ishikawa et al. |
| 2009/0119482 | A1 | | 5/2009 | Ishikawa et al. |
| 2010/0306193 | A1 | * | 12/2010 | Pereira .............. G06F 17/30784 707/728 |
| 2012/0057209 | A1 | | 3/2012 | Nakamura |
| 2012/0189200 | A1 | | 7/2012 | Nakamura |

(Continued)

FOREIGN PATENT DOCUMENTS

| | | |
|---|---|---|
| JP | 7-141166 | 6/1995 |
| JP | 2000-285141 | 10/2000 |
| JP | 2004-272350 | 9/2004 |

*Primary Examiner* — Rehana Perveen
*Assistant Examiner* — Huen Wong
(74) *Attorney, Agent, or Firm* — Harness, Dickey & Pierce, P.L.C.

(57) ABSTRACT

An information processing apparatus, a clustering method, and a clustering program stored on a recording medium, each of which determines an initial value of model parameter of an input data set based on a model parameter of a reference data set that is similar to the input data set and is previously clustered, modifies the initial value so as to match the input data set, and to obtain a clustering result of the input data set using the updated initial value of model parameter.

20 Claims, 8 Drawing Sheets

(56) References Cited

U.S. PATENT DOCUMENTS

| | | |
|---|---|---|
| 2012/0189209 A1 | 7/2012 | Nakamura |
| 2013/0021628 A1 | 1/2013 | Nakamura |
| 2013/0027759 A1 | 1/2013 | Nakamura |
| 2013/0135635 A1 | 5/2013 | Nakamura |

* cited by examiner

INFORMATION PROCESSING APPARATUS, CLUSTERING METHOD, AND RECORDING MEDIUM STORING CLUSTERING PROGRAM

CROSS-REFERENCE TO RELATED APPLICATIONS

This patent application is based on and claims priority pursuant to 35 U.S.C. §119 to Japanese Patent Application No. 2012-257203, filed on Nov. 26, 2012, and 2013-120922, filed on Jun. 7, 2013, in the Japan Patent Office, the entire disclosure of which is hereby incorporated by reference herein.

BACKGROUND

Technical Field

The present invention generally relates to an information processing apparatus, a clustering method, and a clustering program stored in a non-transitory recording medium, each of which is capable of clustering an input data set.

Description of the Related Art

Clustering may be applied to classify a data set into classes for data analysis. For example, as described in Japanese Patent Application Publication No. 2004-272350, a data set is classified into a number of classes using the Gaussian mixture model as the probability density function, even when the number of classes is not known or the distribution differs among classes.

SUMMARY

Example embodiments of the present invention include an information processing apparatus, a clustering method, and a clustering program stored on a recording medium, each of which determines an initial value of model parameter of an input data set based on a model parameter of a reference data set that is similar to the input data set and is previously clustered, modifies the initial value so as to match the input data set, and to obtain a clustering result of the input data set using the updated initial value of model parameter.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
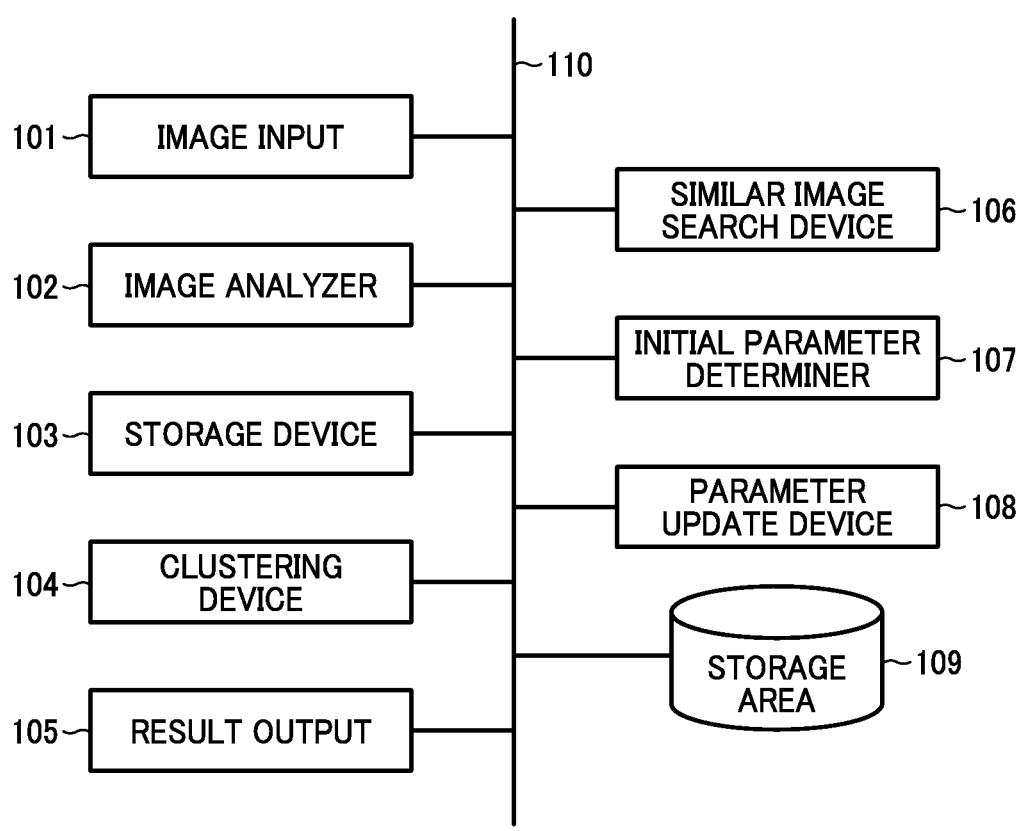
FIG. 1 is a schematic block diagram illustrating a functional structure of an information processing apparatus, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Referring now to the drawings, example embodiments of the present invention are described. For the descriptive purposes, in the following example embodiment, a data set in a two-dimensional feature space is described. Alternatively, a dimension of the feature space may be one, or equal to or greater than three.

Figure 6A:
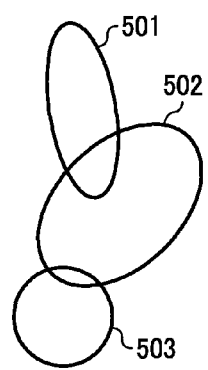
FIGS. 6A to 6C are an illustration for explaining concept of clustering a data set, using the background technique.
Figure 6B:
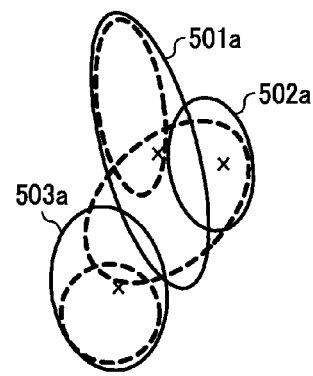
Figure 6C:
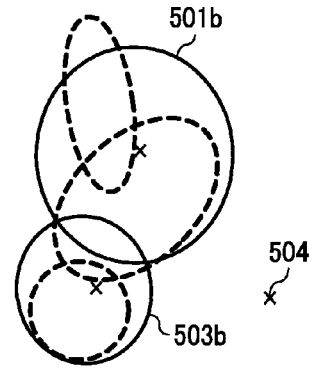

FIG. 6A illustrates an example data set in two-dimensional distribution. These clusters 501 to 503, each of which is shown as an ellipse, are partly overlapped with one another. More specifically, the data set of FIG. 6A has the cluster 502 having a large distribution size, and the clusters 501 and 503 each having a small distribution size. FIG. 6B and FIG. 6C respectively illustrate different results obtained by applying the known clustering method to the data set of FIG. 6A. For example, the K-means clustering method or the Gaussian mixture model may be applied. In FIGS. 6B and 6C, the dashed lines represent the clusters of the data set being input (in this case, the data set of FIG. 6A), and the solid lines represent the clustering results of the data set. The mark "X" indicates the centroid of each class (cluster). At the time when the clustering process starts, the initial value of the centroid is randomly assigned for each class.

In the known clustering method shown in FIG. 6B or 6C, it is assumed that a number of classes in the data set are previously known. Unless the number of classes are known, it may be difficult to select an appropriate number of classes for the data set being input. Further, the known clustering method randomly assigns a data point to the class that has the closest centroid. Accordingly, the initial clusters may not accurately reflect the actual clusters, such that it may sometimes generate an empty class to which no data is assigned.

In FIG. 6B, the initial value of centroid is given for each cluster, based on assumption that the number of clusters are known. Each initial value is randomly generated within the data domain. Since the clusters in the data set of FIG. 6A are partly overlapped, partitioning of classes may not be accurate, thus resulting in the clustering results 501a, 502a, and 503a. More specifically, this method tends to place the initial clusters close to the peak value of the data set, and re-assigns the data point to the nearest class. Accordingly, this method tends to place the centroid of each class closer to the cluster 502 having a larger number of data points, such that the smaller clusters 501 and 503 are not correctly recognized.

In FIG. 6C, the initial value of centroid is given for each cluster, based on assumption that the number of clusters are known. In this example, the initial value is randomly set for each class. For this reasons, one initial value 504 is set at a position where no input data is present, thus resulting in an empty class. Accordingly, the data set of FIG. 6A is clustered into two classes 501b and 503b.

As described above referring to FIGS. 6B and 6C, the K-means clustering method randomly assigns the initial classes to the data set, such that the clustering results may depend on the initial clusters. This may generate different clustering results, depending on how the initial clusters are assigned.

In view of this, in the following example embodiments of the present invention, an initial value of each class is determined based on a model parameter of a reference data set that is similar to a data set subjected for clustering. The initial value, which is determined based on the model parameter of the reference data set, may be modified so as to match the data set being input.

Figure 6D:
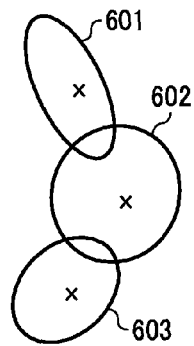
FIGS. 6D and 6E are an illustration for explaining concept of clustering a data set, according to an example embodiment of the present invention.

More specifically, the clustering method firstly searches a reference data set, which is similar to an input data set. It is assumed that a database is provided, which stores a plurality of reference data sets, each of which has been clustered. From the database, the reference data set that is determined to be similar to the input data set based on predetermined criteria is selected. For example, it is assumed that the reference data set of FIG. 6D is obtained for the input data set of FIG. 6A, which has the clusters 601, 602, and 603. The data set of FIG. 6A and the data set of FIG. 6D are determined to be similar, for example, in terms of a number of clusters, a shape of each cluster, and the overlapping regions of the clusters.

The clustering method further obtains a reference parameter, and sets the reference parameter as the initial value for the input data set. More specifically, the reference parameter (indicated by the "X" mark) is obtained, from the clustering result, that is, the clusters 601, 602, and 603, of the reference data set of FIG. 6D. The reference parameter indicates, for example, the number of clusters (the number of classes) in the data set, the centroid of the data points in the cluster, and spread of the data points in the cluster. Since the input data set of FIG. 6A and the reference data set of FIG. 6D are similar in distribution, the clustering result of the reference data set is assumed to be similar to the desired clustering result of the input data set. Based on this assumption, the reference parameter, obtained from the reference data set of FIG. 6D, is set as the initial value of the input data set of FIG. 6A.

Figure 6E:
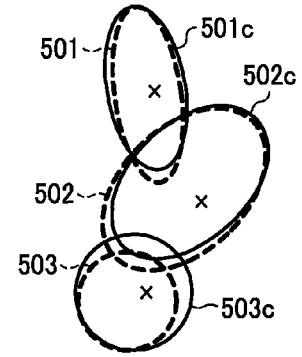

The clustering method further clusters the input data set having the clusters 501, 502, and 503, using the initial value that is determined using the reference parameter. FIG. 6E shows the clustering result having the clusters 501c, 502c, and 503c. Based on assumption that the initial value, which is set using the reference parameter obtained from the reference data set, is close to the desired clustering result of the input data set, the desired clustering result can be obtained by slightly modifying the initial value. Since the best solution is searched within a neighboring set of the global optimization solution, the risk of having the clustering result based on the local optimum solution is lowered.

Figure 2:
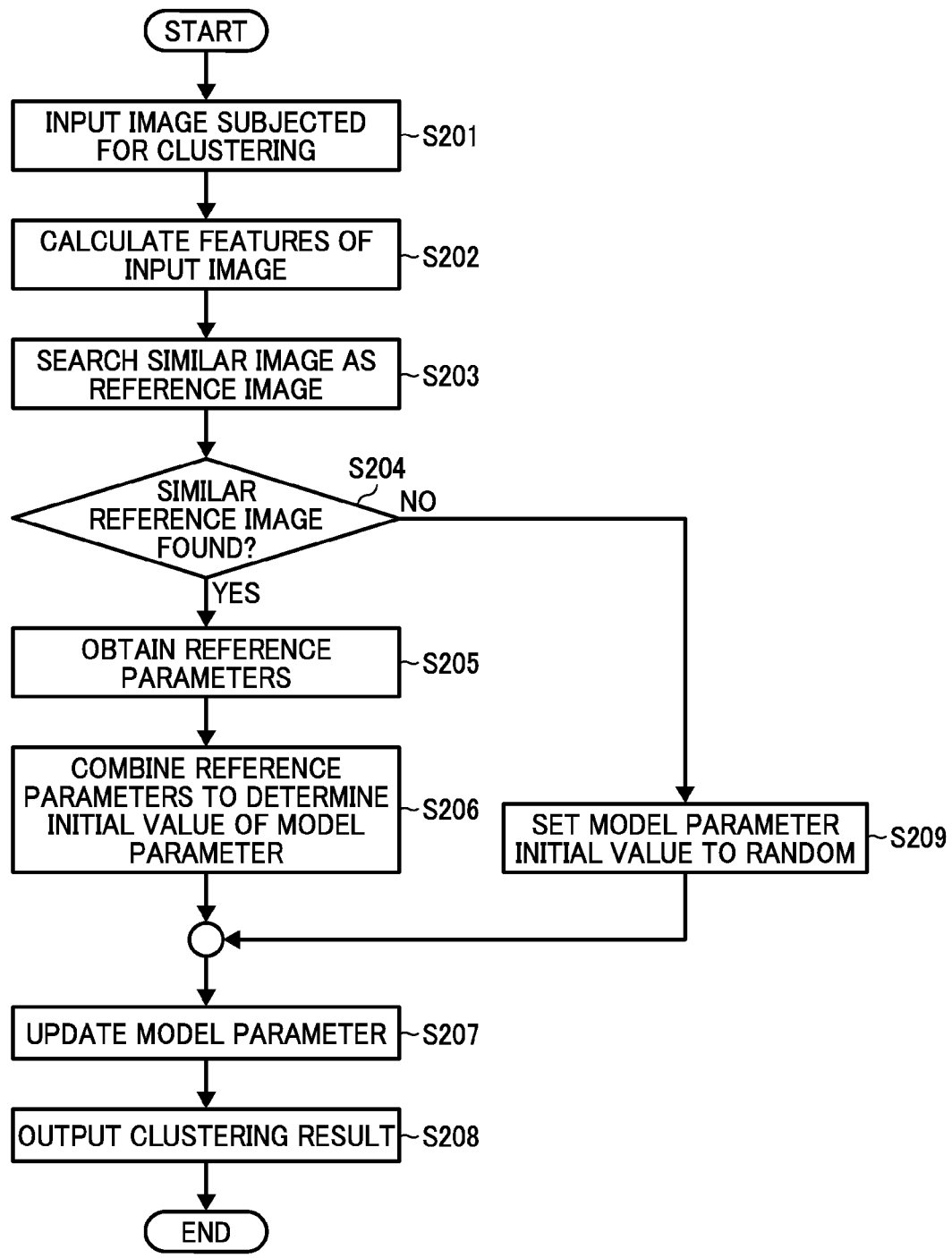
FIG. 2 is a flowchart illustrating operation of clustering a data set, performed by the information processing apparatus of FIG. 1, according to an example embodiment of the present invention.
Figure 3:
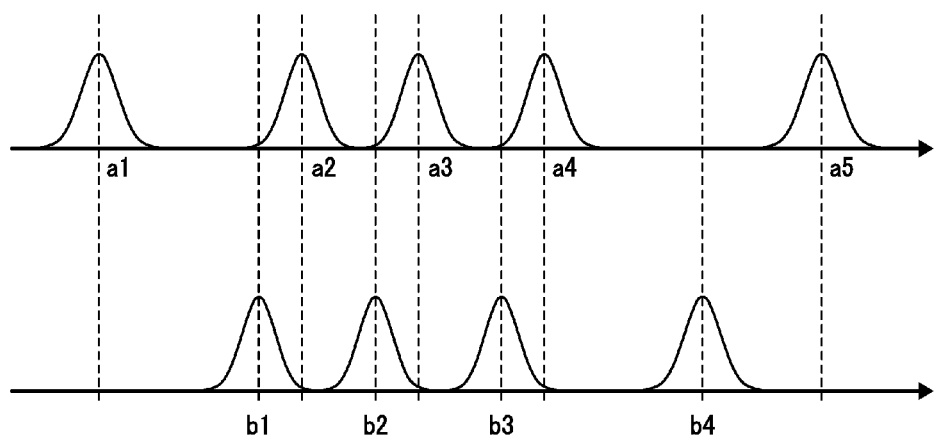
FIG. 3 is an illustration for explaining operation of combining a plurality of reference data sets, according to an example embodiment of the present invention.

Referring now to FIGS. 1 to 3, an example embodiment of the present invention is described. In this embodiment, an image, which is a two-dimensional data set, is subjected for clustering. The image includes a plurality of image pixels, each of which corresponds to a data point in the data set. Alternatively, a set of image pixels may be treated as a data point in the data set. The image pixels in the image are clustered into a plurality of image areas each of which corresponds to a cluster.

FIG. 1 illustrates an example functional structure of an information processing apparatus capable of performing a clustering method. More specifically, the clustering program may be loaded onto a memory of the information processing apparatus, which causes the information processing apparatus to have the functional structure illustrated in FIG. 1. The information processing apparatus of FIG. 1 includes an image input 101, an image analyzer 102, a storage device 103, a clustering device 104, a result output 105, a similar image search device 106, an initial parameter determiner 107, a parameter update device 108, and a storage area 109, which are connected via a network bus 110. The image input 101, which may be implemented by a processor, inputs an image ("input image") subjected for clustering. The image analyzer 102, which may be implemented by the processor, analyzes the input image to calculate the feature of the input image. The storage device 103, which may be implemented by the memory, stores the input image and the feature of the input image. The clustering device 104, which may be implemented by the processor, clusters a probability density distribution of the input image, using the updated model parameter. The result output 105, which may be implemented by the processor that may operate in cooperation with an output device, outputs the clustering result of the input image, which is generated by the clustering device 104. The output device may be any desired display. The similar image search device 106, which may be implemented by the processor, searches through a storage area, such as the storage area 109, to obtain a reference image similar to the input image. The initial parameter determiner 107, which may be implemented by the processor, determines the initial value of the model parameter, using the degree of similarity of the reference image with the input image, and the reference parameter of the reference image. The parameter update device 108, which may be implemented by the processor, updates the initial value of the model parameter so as to match the input image. The updated model parameter is used by the clustering device 104 to cluster the input image. The storage area 109, which may be implemented by the memory, stores the model parameter (reference parameter) of the mixture distribution used for clustering, in association with the reference image and the feature of the reference image.

FIG. 2 is a flowchart illustrating operation of clustering the input image, performed by the information processing apparatus of FIG. 1, according to an example embodiment of the present invention.

At S201, the image input 101 inputs an image subjected for clustering. The input image may be any data, which may be read out from a recording medium such as a CD, DVD, or HDD, or obtained through scanning an original image.

At S202, the image analyzer 102 calculates the feature of the input image, and stores the calculated feature of the input image in the storage device 103. The image analyzer 102 determines a feature space based on the obtained feature of the input image. Examples of the feature of the input image include, but not limited to, feature regarding colors such as RGB values, CIE-XYZ values, and CIE-Lab values, the shape descriptor such as SIFT, SURF, HoG, etc., and the texture descriptor such as local binary pattern (LBP) or Harr-like. The feature of the input image to be used depends on the objective of clustering the input image. More specifically, the user can select the suitable feature of the input image or the feature space, according to the objective of clustering. Alternatively, the pixel values of the input image may be used as the feature of the input image.

For example, the feature corresponding to the image pixel or image pixel set of the input image is mapped on the feature space, to construct the probability density distribution. If the CIE-Lab space is selected as the feature space, the three-dimensional probability density distribution is generated. To simplify calculation, the dimension of the probability density distribution may be transformed using the principle component analysis, or may be expressed as a combination of lower dimensions. For example, the three-dimensional probability density distribution may be approximately expressed as three, one-dimensional probability density distributions.

At S203, the similar image search device 106 searches the storage area 109 for a reference image, which is similar to the input image. For example, the similar image search device 106 calculates the degree of similarity between the feature of the input image and the feature of the reference image, for example, in terms of distance, to obtain the reference image that is similar to the input image. For example, the similar image search device 106 may use any desired known method, such as the method described in Japanese Patent Application Registration No. 4340367 (Publication No. 2000-285141). The feature used for searching a similar image, may be the same as the feature of the input image that is used for clustering, or different from the feature of the input image used for clustering. In addition to the feature related to the image, any other feature characterizing the probability density distribution in the feature space may be used to measure the similarity between the input image and the reference image.

When it is determined that the reference image is found ("YES" at S204), the operation proceeds to S205. When it is determined that the reference image is not found ("NO" at S204), the operation proceeds to S209.

In the above-described example, the feature used for clustering the input image and the feature used for searching a reference image may be different from each other. For example, the RGB values of the input image may be used for clustering the input image, while the shape descriptor or texture descriptor may be used for searching a reference image based on the degree of similarity to the input image. Using the color information, the image may be divided into a plurality of color regions. More specifically, assuming that the input image is a landscape picture, the image pixels of the input image are classified into a blue region corresponding to the sky, a green region corresponding to the grass, and an orange region corresponding to the earth.

In searching a reference image similar to the input image, the shape descriptor or the texture descriptor is preferably used, as the positional relationship or relativity in space among the image pixels may be used for searching the similar image. For example, if each image pixel in the image is plotted as a data point in the RGB space, the positional relationship among the image pixels would be lost, such that it would be difficult to express the contents of the image. In contrary, the shape or texture descriptor may be used to evaluate or calculate the similarity between the images as the shape or texture descriptor can convey information regarding the contents of the image.

In this example, the storage area 109 may store the reference image and the reference parameter in association with each other. Alternatively, the storage area 109 may store the feature of the reference image in association with the reference parameter. The feature of the image can be used for identifying the image from which the feature is obtained. The reference parameter may be stored in association with the reference image itself, or with the feature obtained from the reference image.

In case the reference image is stored in association with the reference parameter, types of feature of the reference image may be changed, after registering the reference image to the storage area 109. This is because the feature can easily be obtained from the reference image. Further, the reference image may be displayed to a user through a screen.

In case the feature data is stored in association with the reference parameter, a memory space in the storage area 109 can be effectively used as the feature data tends to be smaller in data size than that of the reference image. Since the feature needs to be calculated for searching the similar image, the image processing apparatus does not have to calculate the feature from the reference image, if the feature data is stored, thus increasing the processing speed.

Alternatively, the reference parameter may be stored in association with the reference image and the feature data of the reference image.

Still referring to FIG. 2, at S205, when the reference image similar to the input image is obtained, the similar image search device 106 reads out the reference parameter, which is stored in association with the reference image and/or the feature data, from the storage area 109. The reference parameter is a model parameter, which is used for clustering the reference image.

Assuming that the Gaussian mixture model is applied, the model parameter includes the number of classes "K", and the Gaussian distribution parameters including the average "$\mu$", the variance "s", and the mixture weight "w" for each class. If the feature space is three-dimensional, the average "$\mu$" is a three-dimensional vector, the variance "s" is a 3×3 matrix (covariance matrix), and the mixture weight "w" is a scalar value. Alternatively, the variance "s" may be a three-dimensional vector, generated by extracting only diagonal components of a matrix. If the three-dimensional feature space is expressed as three, one-dimensional feature spaces, the average "$\mu$", the variance "s", and the mixture weight "w" are each expressed as a scalar value such that three sets of scalar values are needed for one Gaussian distribution. In this example, the reference parameter, which is stored in the storage area 109, may be generated by clustering the data set either manually or using software program such as the clustering program.

At S206, the initial parameter determiner 107 determines the initial value of the model parameter to be used for clustering the input image, by combining the reference parameters of the reference images based on the similarity of the reference image to the input image.

In one example, the reference parameter of the reference image having the highest degree of similarity is used. Assuming that the input image is the same as the reference image, the reference parameter of the reference image is used as the initial value of the input image. While this method is simple, the clustering result depends on the degree of similarity between the input image and the reference image.

In another example, the reference parameters of the reference images each having the degree of similarity that is higher than a threshold value are averaged to obtain the reference parameter. This method is relatively simple, when compared with various other methods in which the reference parameter is obtained from a set of reference images each of which is similar to the input image. Even in case the reference image having the highest degree of similarity cannot be obtained, the desired reference parameter can be stably obtained based on a plurality of reference images each of which is similar to the input image.

In another example, the weighted average of the reference parameters of the reference images, each of which is similar to the input image, is obtained, while weighting the parameter based on the degree of similarity. The reference image having the higher degree of similarity has more weight. While this method is more complex than the method of obtaining the average value of the reference parameters, stability and accuracy are expected to increase.

In order to combine a plurality of reference parameters, the respective distributions in the mixture distribution model, which is a model of the probability density distribution, of the respective reference images, need to be associated between or among the reference images. In the mixture distribution in which a plurality of distributions is present, the distribution in one reference image needs to be associated with the distribution in the other reference image, to combine the reference parameters of the reference images.

The distribution can be associated between or among the reference images, for example, using any one of the following methods.

In one example, the distribution in one reference image is associated with the distribution in the other reference image, based on the center of the distribution. Assuming that there are the reference image A having a distribution of data points {a1, . . . , ak}, and the reference image B having a distribution of data points {b1, . . . , bk}, the distance between the center of the distribution in the reference image A and the center of the distribution in the reference image B is obtained. The distribution in the reference image A and the distribution in the reference image B, which have the shortest distance, are combined. The distance between the distributions may be expressed, for example, in the Euclidean distance.

In another example, the distribution in one reference image is associated with the distribution in the other reference image, based on the order when the distributions are arranged by an order based on predetermined criteria. For example, the distribution of data points {a1, . . . , ak} in the reference image A, and the distribution of data points {b1, . . . , bk} of the reference image B are respectively sorted by a predetermined rule. The first distribution in the reference image A is associated with the first distribution in the reference image B. The second distribution in the reference image A is associated with the second distribution in the reference image B. In a similar manner, the distribution in the reference image A is associated with the distribution in the reference image B, so that the distributions having the same order are combined. For example, in case the feature space is CIE-Lab space, the distributions in the reference image may be sorted by the luminosity value.

In another example, in alternative to associating the distributions in the reference images in order, the distribution having the same degree of luminosity may be associated between the reference image A and the reference image B.

In case when the number of classes differs between or among the reference images, one of the following techniques may be used to associate the distributions. For simplicity, it is assumed that there are the references images A and B.

In one example, the distributions are associated between the reference image A and the reference image B, using the number of classes in the reference image having the greatest number of classes, either based on the center of distribution or the order of distribution. Except for the reference image having the greatest number of classes, the distributions in the other reference image are respectively associated with at least some of the distributions in the reference image having the greatest number of classes. The number of classes is not changed. (approach "a")

In another example, the distributions are associated between the reference image A and the reference image B, using the number of classes in the reference image having the smallest number of classes, either based on the center of distribution or the order of distribution. Except for the reference image having the smallest number of classes, the distributions in the other reference image are respectively associated with the distributions in the reference image having the smallest number of classes. The number of classes is not changed. (approach "b")

In another example, the distribution in the reference image A is associated with the distribution in the reference image B, when the centers of the distributions are close to each other for these reference images. For the distribution having the center that is not close to the center of the distribution of the other reference image, the distributions are not associated, but added. More specifically, when the distance between the center of the distribution for the reference image A and the center of the distribution for the reference image B is equal to or less than a threshold, those distributions are associated with each other. When the distance between the center of the distribution for the reference image A and the center of the distribution for the reference image B is greater than the threshold, the data points in the distribution of the reference image is simply added without being associated with the distribution of the other reference image. The number of classes may increase in the processing. (approach "c")

In another example, the distribution in the reference image A is associated with the distribution in the reference image B, when the centers of the distributions are close to each other for these reference images. For the distribution having the center that is not close to the center of the distribution of the other reference image, such distribution is deleted. More specifically, when the distance between the center of the distribution for the reference image A and the center of the distribution for the reference image B is equal to or less than a threshold, those distributions are associated with each other. When the distance between the center of the distribution for the reference image A and the center of the distribution for the reference image B is greater than the threshold, the data points in the distribution of the reference image is ignored. The number of classes may decrease in processing. (approach "d")

In another example, the distribution in the reference image A is associated with the distribution in the reference image B, when the centers of the distributions are close to each other for these reference images. When the number of distributions, which are combined, exceeds a threshold, those distributions are taken into account. While this approach "e" is similar to the approach "c", for each distribution, the number of distributions being associated with the distribution is managed. When this number of distributions exceeds the threshold, that is, when the distribution is frequently associated, such distribution is taken into account.

Referring now to FIG. 3, operation of associating the distributions between the reference images, based on the distance between the center of one reference image and the center of the other reference image, is explained according to an example embodiment of the present invention.

The reference image A, with five classes, has the distributions {a1, a2, a3, a4, a5}. The reference image B, with four classes, has the distributions {b1, b2, b3, b4}. For the descriptive purposes, each distribution is expressed in one-dimensional, and the distributions are not overlapped with one another.

In the approach "a", based on the reference image A having the greatest number of classes, the distributions {a1, a2, a3, a4, a5} are relatively associated with the distributions {b1, b2, b3, b4}. Assuming that the distributions are associated with each other, which have the centers with the smallest distance, the distributions b1, b2, b3, and b4 are respectively associated with the distributions a2, a3, a4, and a5. The resultant number of classes will be five.

In the approach "b", based on the reference image B having the smallest number of classes, the distributions {b1, b2, b3, b4} are relatively associated with the distributions {a1, a2, a3, a4, a5}. Assuming that the distributions are associated with each other, which have the centers with the smallest distance, the distributions a1 and a2, a3, a4, and a5 are respectively associated with the distributions b1, b2, b3, and b4. The resultant number of classes will be four.

In the approach "c", the distributions a2, a3, and a4 are respectively associated with the distributions b1, b2, and b3. The distributions a1, a5, and b4 are not associated with any distribution, as the distance with the closest distribution exceeds a threshold. The resultant number of classes will be six.

In the approach "d", the distributions a2, a3, and a4 are respectively associated with the distributions b1, b2, and b3, in a substantially similar manner as described above in the case of approach "c". The distributions a1, a5, and b4, which are not associated with any distribution, are deleted. The resultant number of classes will be three.

In the approach "e", the distributions a2, a3, and a4 are respectively associated with the distributions b1, b2, and b3, in a substantially similar manner as described above in the case of approach "c". Assuming that the threshold of the number of distributions is 2, the distributions a1, a5, and b4, each of which has one distribution are deleted. The resultant number of classes will be three.

In alternative to the above-described approaches, the distributions may be combined in various other ways. For example, the similarity between the input image and the reference image may indicate the similarity in shape of the probability density distribution in the feature space. Using the number of classes of the reference parameter of the reference image having the highest degree of similarity, the distributions may be associated based on any one of the above-described distribution model parameter. That is, the number of classes and the distribution model parameter may be determined, based on different criteria.

Referring back to FIG. 2, at S209, when there is no reference image that is similar to the input image, the initial parameter determiner 107 randomly determines the initial value of the model parameter.

At S207, the parameter update device 108 updates the initial value of the model parameter so as to match the probability density distribution in the feature space of the input image, using any desired known method. For example, the EM algorithm may be used to update the initial value.

At S208, the clustering device 104 clusters the probability density distribution in the feature space using the model parameter, and outputs the clustering result through the result output 105.

The data to be output may be determined according to the intended use of the clustering result. Examples of output data include, but not limited to, a model parameter value, and a list indicating the association between each pixel and a class. Alternatively, the input image may be divided into a plurality of image sections based on the clustering result in the feature space, such that the divided images may be output.

For example, the clustering result may be output in the form of image, as follows.

In one example, an image, called a label map, is prepared, which is used to manage the class number assigned to each class, for the same number of classes of the input image. The label identification of the class to which each pixel of the input image belongs is recorded in the pixel on the label map.

In another example, an image, called a binary map, having the same size as the input image is prepared for the number of classes of the input image. If a pixel included in the input image belongs to a specific class, the corresponding pixel on the map is recorded with "1". If a pixel included in the input image does not belong to the specific class, the corresponding pixel on the map is recorded with "0". This is performed for each class. The value to be recorded in the binary map is not limited to "0" and "1". As long as the class can be identified, any value may be used.

In another example, an image, called a multivalue map, having the same size as the input image is prepared for the number of classes of the input image. For each class, the probability in which each pixel of the input image belongs to that class is recorded to the corresponding pixel on the map. Generally, the value of the map ranges between "0" and "1". The sum of the same values on all maps will be "1". Depending on the design of the multivalue map, such condition may not be satisfied.

The above-described clustering method may be applied to segment an image into a plurality of sections. Through image segmentation, the image is segmented into a plurality of image sections based on its contents or features. For example, the landscape image may be divided into a section corresponding to the sky, a section corresponding to the mountain, a section corresponding to the forest, and a section corresponding to the lake. Assuming that the image is segmented based on colors, the above-described clustering method may be applied to the distributions in the data set in feature space, while the feature is based on the color.

It is assumed that the sky has the blue color, the mountain has the bright green color, the forest has the dark green color, and the lake has the bright blue color. While the size of a unit section depends on the type of the image or the objective of image segmentation, in this example, the image is segmented into the above-described sections.

If a random value, or a representative value predefined for each of the color categories (red, blue, yellow, green, etc.), is used as the initial value of the model distribution, in some cases, the sky section and the lake section having the similar tone, or the mountain section and the forest section having the similar tone, may be classified as the same region. In other cases, the sections that should be classified into the same region may be classified into different regions. In the former cases, the regions are under-segmented. In the latter cases, the regions are over-segmented.

As described above, since the size of a unit region, or the number of regions, is determined based on various factors, it would be difficult to automatically determine the size of the region or the number of regions. In view of this, a reference image, to which image segmentation is previously applied, is used to segment an image (input image). This is based on assumption that a similar image that is similar to the input image should have the similar image segmentation result. The image segmentation result, such as the reference parameter, of the reference image is used to segment the input image, to improve accuracy in image segmentation.

It is now assumed that there is a landscape image, which is previously captured and has been segmented into the sky section having the blue color, the mountain section having the bright green color, the forest section having the dark green color, and the river section having the bright blue color. As long as this image is obtained as a reference image through similar image searching, the input image can be set with the initial value based on the reference image. That is, the sky section of the input image is set with the blue color of the sky section of the reference image; the mountain section of the input image is set with the mountain section of the reference image; the forest section of the input image is set with the dark green color of the mountain section of the reference image; and the lake section of the input image is set with the bright blue color of the river section of the reference image. Further, the number of regions is determined to be four. With this clustering method that utilizes the reference image, the image can be segmented while suppressing the problem of over-segmentation or under-segmentation, thus improving the accuracy in image segmentation. In alternative to using one reference image, or the parameter of one reference image, a plurality of reference images may be combined to determine the initial value of the input image.

Now, example operation of segmenting the input image, one section by one section, is explained. The above-described method of using the model parameter of the reference image, which is obtained through similar image searching, can be applied to the case in which the input image is segmented, section by section. The reference image, which is obtained through searching, does not have to be exactly the same as the input image in terms of pattern. If at least a part of the input image matches a part of the reference image, the reference parameter of the reference image may be used.

However, if a part of the reference image matches at least a part of the input image, using the reference parameter of the reference image may cause the problem. In such case, only the part of the input image that corresponds to the part of the reference image may be segmented using the reference parameter of the reference image. The part other than the segmented part of the input image may be segmented, using the reference parameter of a reference image that is newly obtained through searching. By performing operation of segmenting for each section of the input image using the corresponding reference parameter, the entire input image can be segmented. Alternatively, the reference parameters of a plurality of reference images each of which corresponds to at least a part of the input image may be combined to be set as the initial value for clustering the input image. The reference parameters may be combined, for example, using any one of the above-described combining method.

Figure 4:
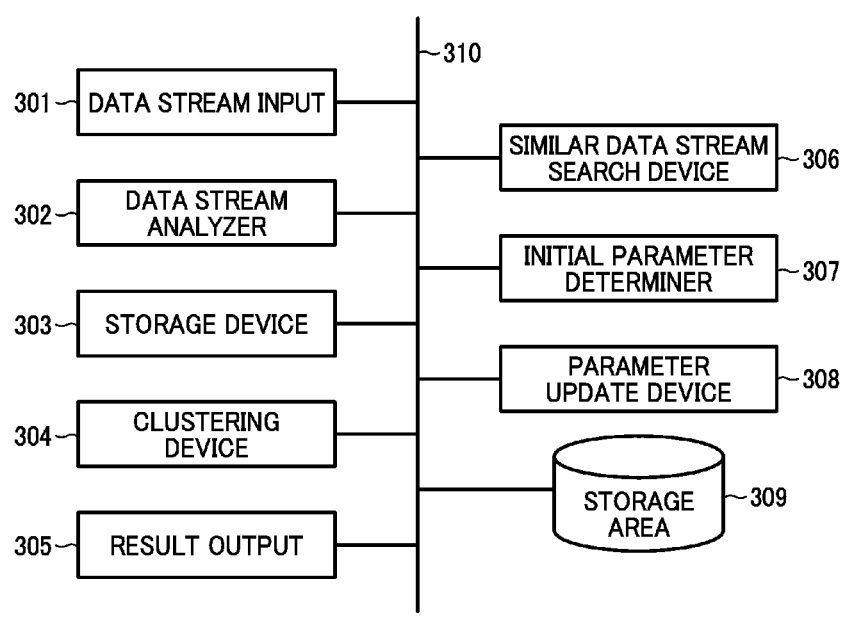
FIG. 4 is a schematic block diagram illustrating a functional structure of an information processing apparatus, according to an example embodiment of the present invention.
Figure 5:
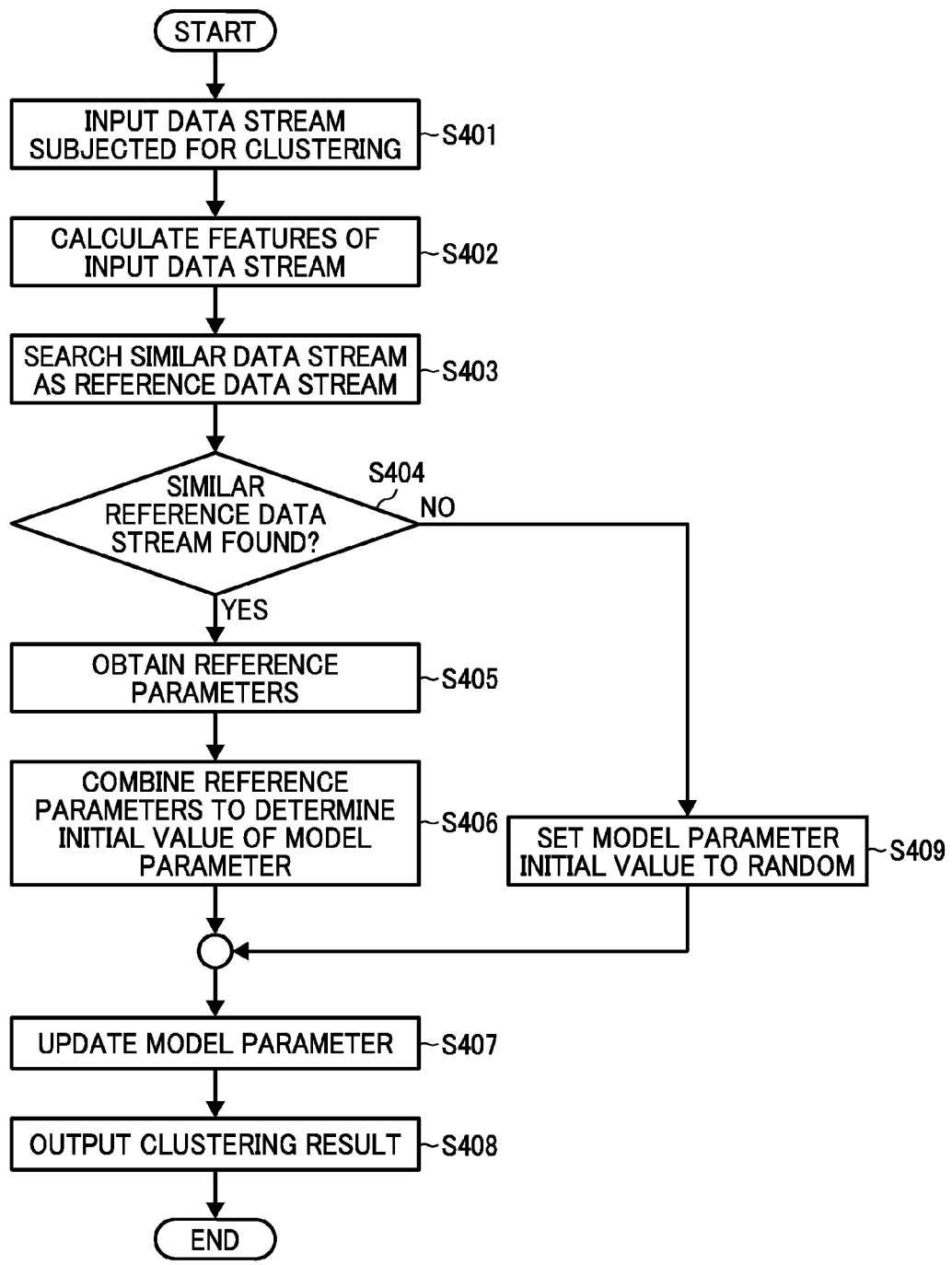
FIG. 5 is a flowchart illustrating operation of clustering a data set, performed by the information processing apparatus of FIG. 4, according to an example embodiment of the present invention.

Referring now to FIGS. 4 to 5, an example embodiment of the present invention is described. In this embodiment, a data stream, that is, one-dimensional data stream, is subjected for clustering.

FIG. 4 illustrates an example functional structure of an information processing apparatus capable of performing the clustering method according to this embodiment of the present invention. More specifically, the clustering program may be loaded onto a memory of the information processing apparatus, which causes the information processing apparatus to have the functional structure illustrated in FIG. 4. The image processing apparatus of FIG. 4 includes a data stream input 301, a data stream analyzer 302, a storage device 303, a clustering device 304, a result output 305, a similar data stream search device 306, an initial parameter determiner 307, a parameter update device 308, and a storage area 309, which are connected through a network bus 310. The data stream input 301, which may be implemented by a processor, inputs a data stream subjected for clustering. The data stream analyzer 302, which may be implemented by the processor, analyzes the input data stream to calculate the feature of the input data stream. The storage device 303, which may be implemented by the memory, stores the input data stream and the feature of the input data stream. The clustering device 304, which may be implemented by the processor, clusters a probability density distribution of the input data stream, using the updated model parameter. The result output 305, which may be implemented by the processor that may operate in cooperation with an output device, outputs the clustering result of the input data stream, which is generated by the clustering device 304. The output device may be any desired display. The similar data stream search device 306, which may be implemented by the processor, searches through a storage area, such as the storage area 309, to obtain a reference data stream similar to the input data stream. The initial parameter determiner 307, which may be implemented by the processor, determines the initial value of the model parameter, using the degree of similarity of the reference data stream with the input data stream, and the reference parameter of the reference data stream. The parameter update device 308, which may be implemented by the processor, updates the initial value of the model parameter so as to match the input data stream. The updated model parameter is used by the clustering device 304 to cluster the input data stream. The storage area 309, which may be implemented by the memory, stores the model parameter (reference parameter) of the mixture distribution used for clustering, in association with the reference data stream and the feature of the reference data stream.

FIG. 5 is a flowchart illustrating operation of clustering the input data stream, performed by the image processing apparatus of FIG. 4, according to an example embodiment of the present invention.

At S401, the data stream input 301 inputs a data stream subjected for clustering. The input data stream may be any data, which may be read out from a recording medium such as a CD, DVD, or HDD.

At S402, the data stream analyzer 302 calculates the feature of the input data stream, and stores the calculated feature of the input data stream in the storage device 303. The data stream analyzer 302 determines a feature space based on the obtained feature of the input data stream. Examples of the feature of the input data stream include, but not limited to, the data value itself, and the data trend such as a gradient. The feature of the input data stream to be used depends on the objective of clustering the input data stream. More specifically, the user can select the suitable feature amount and feature space according to the objective of clustering. For example, the feature corresponding to data or a data set of the input data stream is mapped on the feature space, to construct the probability density distribution as the subject for the model.

At S403, the similar data stream search device 306 searches the storage area 309 for a reference data stream, which is similar to the input data stream. For example, the similar data stream search device 306 may use any known technique such as the Hamming distance or the Levenshtein distance to search a similar data stream. The feature used for searching a similar data stream may be the same as the feature of the input data stream that is used for clustering, or different from the feature of the input data stream used for clustering.

When it is determined that the reference data stream is found ("YES" at S404), the operation proceeds to S405. When it is determined that the reference data stream is not found ("NO" at S404), the operation proceeds to S409.

At S405, when the reference data stream similar to the input data stream is obtained, the similar data stream search device 306 reads out the reference parameter, which is stored in association with the reference data stream, from the storage area 309. The reference parameter is a model parameter, which is used for clustering the reference data stream.

Assuming that the Gaussian mixture model is applied, the model parameter includes the number of classes "K", and the Gaussian distribution parameters including the average "$\mu$", the variance "s", and the mixture weight "w" for each class. In this example, the reference parameter, which is stored in the storage area 109, may be generated by clustering the data set either manually or using software program such as the clustering program.

At S406, the initial parameter determiner 307 determines the initial value of the model parameter to be used for clustering the input data stream, by combining the reference parameters of the reference data streams based on the similarity of the reference data stream to the input data stream.

In one example, the reference parameter of the reference data stream having the highest degree of similarity is used. Assuming that the input data stream is the same as the reference data stream, the reference parameter, i.e., the model parameter of the reference data stream is used as the initial value of the input data stream. While this method is simple, the clustering result depends on the degree of similarity between the input data stream and the reference data stream.

In another example, the reference parameters of the reference data streams each having the degree of similarity that is higher than a threshold value are averaged to obtain the reference parameter. This method is relatively simple, when compared with various other methods in which the reference parameter is obtained from a set of reference data streams each of which is similar to the input data stream. Even in case the reference data stream having the highest degree of similarity cannot be obtained, the desired reference parameter can be stably obtained based on a plurality of reference data streams each of which is similar to the input data stream.

In another example, the weighted average of the reference parameters of the reference data streams, each of which is similar to the input data stream, is obtained, while weighting the parameter based on the degree of similarity. The reference data stream having the higher degree of similarity has more weight. While this method is more complex than the method of obtaining the average value of the reference parameters, stability and accuracy are expected to increase.

In order to combine a plurality of reference parameters, the respective distributions in the mixture distribution model, which is a model of the probability density distribution, of the respective reference data streams, need to be associated between or among the reference data streams. The distribution can be associated between or among the reference data streams, for example, using any one of the methods (approaches "a" to "e") described above referring to FIGS. 1 to 3.

At S409, when there is no reference data stream that is similar to the input data stream, the initial parameter determiner 307 randomly determines the initial value of the model parameter.

At S407, the parameter update device 308 updates the initial value of the model parameter so as to match the probability density distribution in the feature space of the input data stream, using any desired known method. For example, the EM algorithm may be used to update the initial value.

At S408, the clustering device 304 clusters the probability density distribution in the feature space using the model parameter, and outputs the clustering result through the result output 305.

The data to be output may be determined according to the intended use of the clustering result. Examples of output data include, but not limited to, a model parameter value, and a list indicating the association between each data and a class. The clustering result may be output as binary data in which each data is assigned with one class, or as multivalue data in which each data is assigned with the probability in belonging to each class.

As described above, the data stream having characteristics similar to the input data stream is assumed to have the clustering result similar to the clustering result of the input data stream. The model parameter of the similar data stream, which has been appropriately clustered, may be used to cluster the input data stream, thus improving the accuracy of the clustering result. More specifically, the model parameter of the similar data stream is set as the initial value in clustering the input data stream, and the initial value is modified so as to match characteristics of the input data stream to obtain the clustering result with improved accuracy.

The above-described clustering method may be applied to classify a distribution of test scores into a plurality of groups, such as the high score group, the middle score group, and the low score group, for example, in the education field. While the range of scores belonging to each group may be previously determined, it would be more preferable to determine the range of each group depending on the difficulty of the test. However, it is difficult to objectively decide the difficulty of the test. By applying the above-described clustering method, the distribution of test scores can be objectively classified into a plurality of groups, based on the clustering results that are previously obtained.

In another example, the above-described clustering method may be applied to color reduction process. The number of colors may be reduced, for example, by reducing the number of colors or the number of grayscale color tones. For the descriptive purposes, the following explains the case in which the number of grayscale color tones is reduced. More specifically, it is assumed that the 256-tone grayscale image, which is an input image, is converted into the 3-tone grayscale image. From the input image, a histogram is generated, which indicates the occurrence frequency of pixels for each tone of the input image. The reference image, which is similar to the input image, is searched. In alternative to searching the reference image based on similarity to the input image, the reference image may be selected based on similarity in histogram. Based on a reference parameter of the reference image thus obtained, the initial value of a model parameter for the histogram of the input image is set. This initial value is modified so as to match the input image. Using the modified initial value of the model parameter, the histogram of the input image is clustered into three distributions (clusters) that correspond to the three grayscale tones. If the distributions are overlapped, the boundary between the distributions is set based on a predetermined rule, and used as a threshold to obtain a ternary value. For example, the boundary between the distributions may be set, such that the adjacent distributions have a substantially equal number of data points, or the adjacent distributions have a predetermined ratio in number of data points.

In the color reduction process, for each channel, the above-described clustering method may be applied to reduce the number of colors, while suppressing the computation load. In some cases, however, the resultant colors may not appropriately reflect the colors of the input image. In such case, the relationship between or among the channels needs to be taken into account. More specifically, it is preferable to apply the clustering method to a feature space of two or higher dimension.

Figure 7:
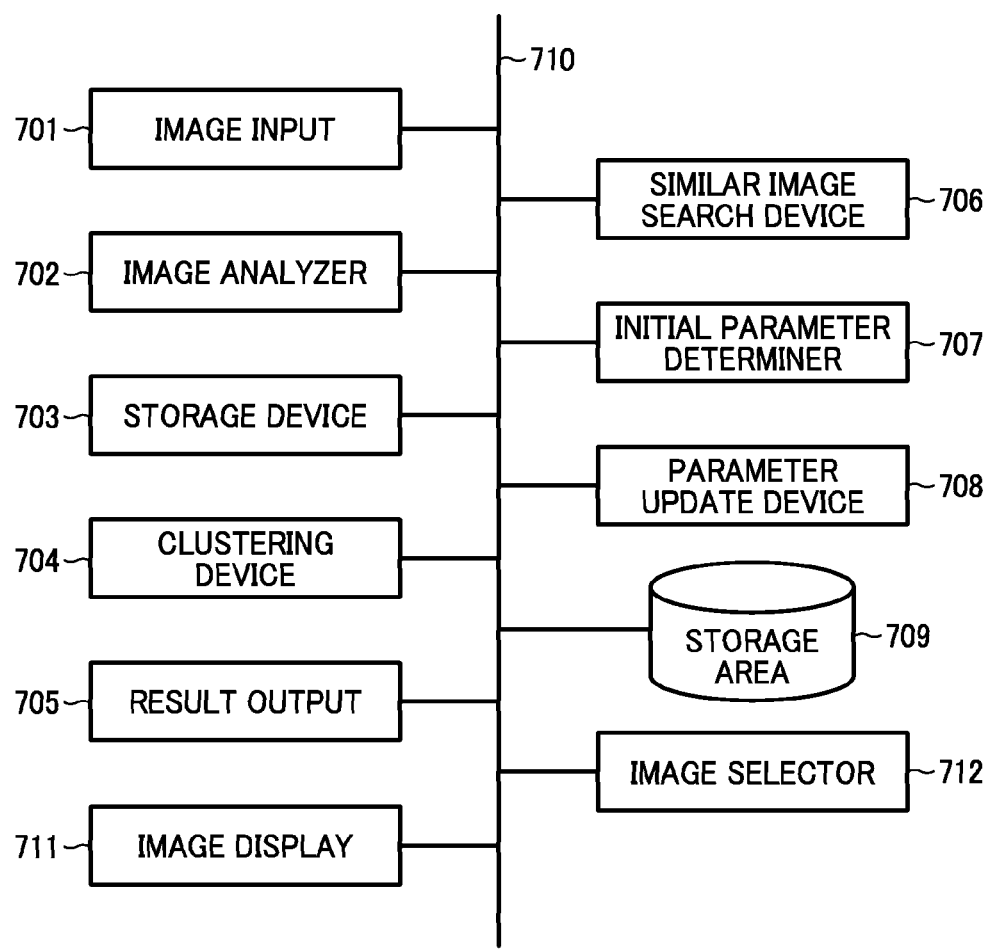
FIG. 7 is a schematic block diagram illustrating a structure of an information processing apparatus, according to an example embodiment of the present invention.
Figure 8:
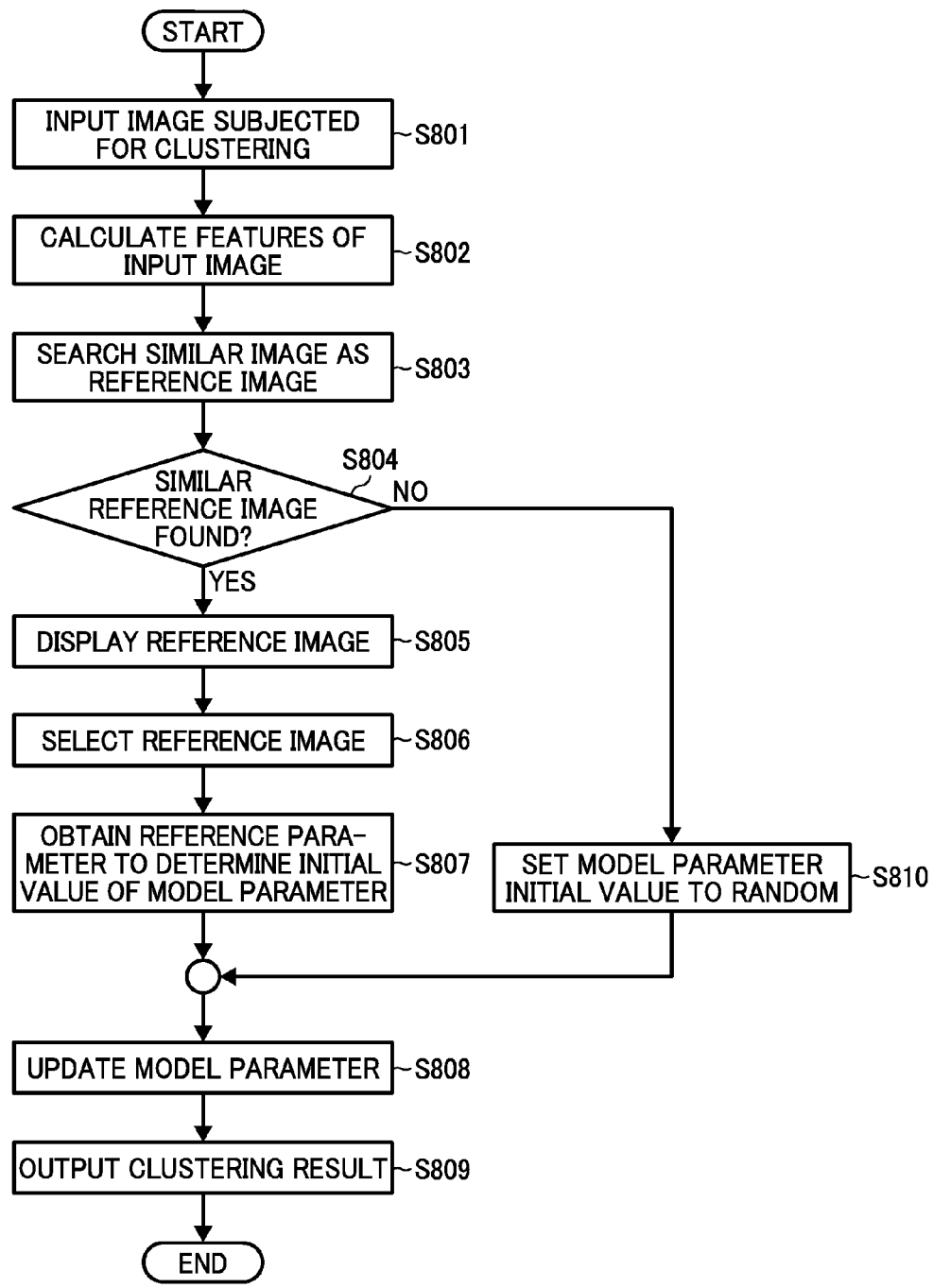
FIG. 8 is a flowchart illustrating operation of clustering a data set, performed by the information processing apparatus of FIG. 7.
Figure 9:
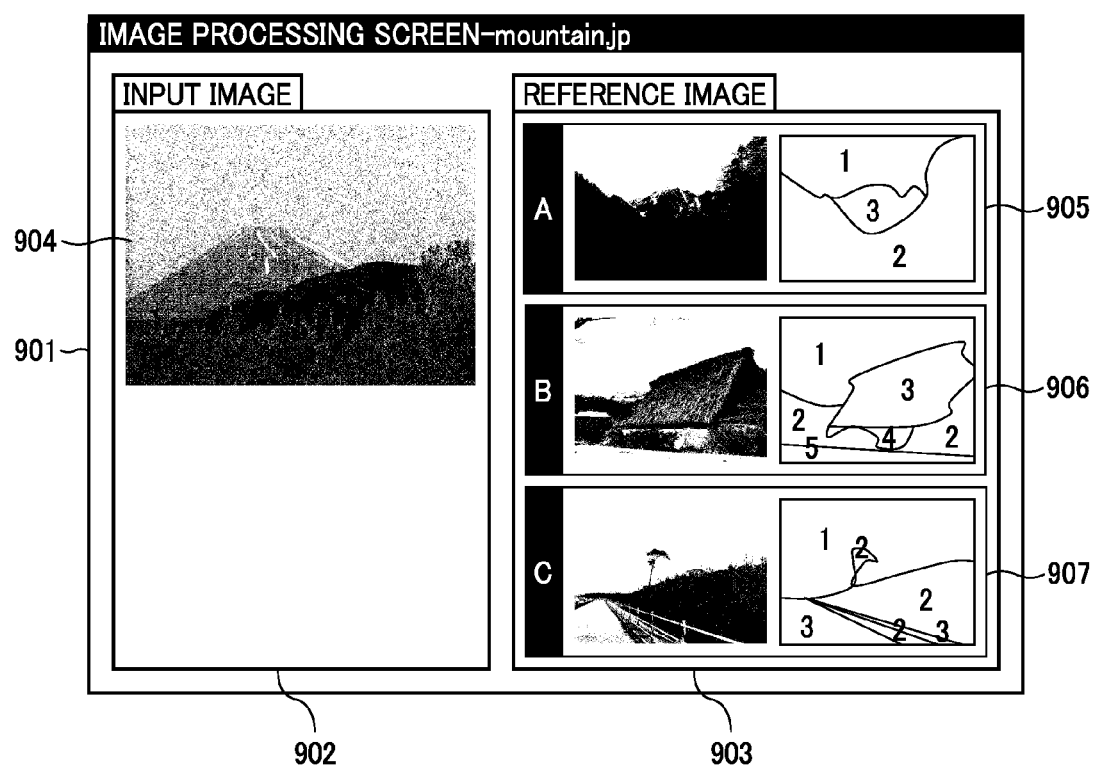
FIG. 9 is an illustration of an example screen displayed by the information processing apparatus of FIG. 7.

Referring now to FIGS. 7 to 9, an example embodiment of the present invention is described. In this embodiment, an image, that is, two-dimensional data stream, is subjected for clustering. The image includes a plurality of image pixels, each of which corresponds to a data point in the data set. Alternatively, a set of image pixels may be treated as a data point in the data set. In dividing the image into a plurality of image areas, an information processing apparatus receives a user instruction.

FIG. 7 illustrates an example functional structure of the information processing apparatus capable of performing a clustering method according to an example embodiment of the present invention. More specifically, the clustering program may be loaded onto a memory of the information processing apparatus, which causes the information processing apparatus to have the functional structure illustrated in FIG. 7. The information processing apparatus of FIG. 7 includes an image input 701, an image analyzer 702, a storage device 703, a clustering device 704, a result output 705, a similar image search device 706, an initial parameter determiner 707, a parameter update device 708, a storage area 709, an image display 711, and an image selector 712, which are connected via a network bus 710.

The image input 701, which may be implemented by a processor, inputs an image ("input image") subjected for clustering. The image analyzer 702, which may be implemented by the processor, analyzes the input image to calculate the feature of the input image. The storage device 703, which may be implemented by the memory, stores the input image and the feature of the input image. The clustering device 704, which may be implemented by the processor, clusters a probability density distribution of the input image, using the updated model parameter. The result output 705, which may be implemented by the processor, outputs the clustering result of the input image, which is generated by the clustering device 704. The similar image search device 706, which may be implemented by the processor, searches though a storage area, such as the storage area 709, to obtain a reference image similar to the input image. The initial parameter determiner 707, which may be implemented by the processor, determines the initial value of the model parameter, using the degree of similarity of the reference image with the input image, and the reference parameter of the reference image. The parameter update device 708, which may be implemented by the processor, updates the initial value of the model parameter so as to match the input image. The updated model parameter is used by the clustering device 704 to cluster the input image. The storage area 709, which may be implemented by the memory, stores the model parameter (reference parameter) of the mixture distribution used for clustering, in association with the reference image and the feature of the reference image. The image display 711, which may be implemented by any desired display, displays the reference image. The image selector 712, which may be implemented by the processor that may operate in cooperation with an input device, accepts selection of the reference image.

FIG. 8 is a flowchart illustrating operation of clustering the input image, performed by the information processing apparatus of FIG. 7, according to an example embodiment of the present invention. The operation of FIG. 8 is substantially similar to the operation of FIG. 2, except for some differences. The differences include deletion of S206 of determining the initial value of the model parameter by combining the reference parameters, addition of S805 of displaying a plurality of reference images that are found as similar images, addition of S806 of receiving selection of at least one reference image being displayed from a user, and addition of S807 of setting the initial value of the model parameter based on the reference parameter of the at least one reference image selected by the user.

For simplicity, the following describes S805 to S807, which are added, such that detailed description of the other steps that are the same as the steps of FIG. 2 are simplified.

At S801, the image input 701 inputs an image subjected for clustering.

At S802, the image analyzer 702 calculates the feature of the input image, and stores the calculated feature of the input image in the storage device 703.

At S803, the similar image search device 706 searches the storage area 709 for a reference image, which is similar to the input image.

At S804, the similar image search device 706 determines whether the reference image is found. When it is determined that the reference image is found ("YES" at S804), the similar image search device 706 stores the reference image that is found and the reference parameter in association with each other in the storage area 709, and the operation proceeds to S805. Further, as described above referring to FIG. 2, the storage area 709 may store the feature of the reference image in association with the reference image. When it is determined that the reference image is not found ("NO" at S804), the operation proceeds to S810.

At S805, the similar image search device 706 reads out the reference image, which is similar to the input image, from the storage area 709, and displays the reference image through the image display 711. At this time, only the reference image may be displayed, or the reference image may be displayed together with the reference parameter of the reference image. In addition to the reference image, the clustering result of the pixels of the reference image may be displayed. The clustering result may be displayed, for example, in the form of an image that shows the distribution of data points in the feature space that is classified into a plurality of classes, while each class being expressed by a different color or assigned with a different numeral. Further, the number of reference images being displayed is not limited to one, such that a plurality of reference images may be displayed.

FIG. 9 illustrates an example screen displaying three reference images, each of which is found as a similar image to the input image. The main window 901 of FIG. 9 includes a display area 902 showing the input image input to the image input 701, and a display area 903 showing the reference images 905, 906, and 907 each of which is obtained from the storage area 709 as images similar to the input image.

For each one of the reference images 905 to 907, an image indicating the clustering result is displayed. Each area of the clustering result image has a plurality of areas, each of which is generated based on the pixels belonging to that particular class, and is assigned with a numeral (one of 1 to 5). The areas in the clustering result image may be apart from one another, depending on the distribution of data points.

In displaying the reference image, it is preferable to sort the order of reference images according to a predetermined rule. For example, the order in displaying the reference images in the display area 903 may be determined based on the degree of similarity between the input image and the reference image, the degree of similarity in data distribution in the feature space between the input image and the reference image, the number of classes in the reference parameter, or the number or frequency in selecting the reference image.

Further, in this example, the clustering result of the reference image may be generated based on the reference parameter of the reference image, when displaying the reference image. Alternatively, the clustering result of the reference image may be previously stored in the storage area 709 in association with the reference image, and read out for display.

Referring back to FIG. 8, at S806, the image selector 712 receives selection of the reference image from the user. For example, the user may use any desired input device such as a mouse to select one of the reference images being displayed through the image display 711, as the reference image to be used for setting the initial value of the model parameter of the input image. In this example, the user may select one or more than one reference image.

For example, referring to FIG. 9, from a list of reference images displayed on the display area 903, the user selects at least one reference image having the clustering result that the user expects to have for the input image. In this example illustrated in FIG. 8, the input image displayed on the display area 904 is a landscape image showing sky in the background, and a mountain over a forest. Assuming that the user wants to classify this input image into a section corresponding to the sky, a section corresponding to the mountain, and a section corresponding to the forest, the user is most likely to select the reference image A having the similar clustering result. When the user selects the reference image A, for example, by pointing with a mouse, the image selector 712 accepts such selection of the reference image A. The reference parameter of the reference image A is now set to be used as the initial value of the model parameter of the input image.

Upon selection of the reference image by the user, the image display 711 may display the clustering result of the input image, which is obtained by setting the initial value of the reference parameter of the selected reference image, as a preview image. By repeating this process of selecting the reference image and viewing the clustering result, the user can feel which reference image is more appropriate to obtain the desired clustering result.

Referring back to FIG. 8, at S807, the initial parameter determiner 707 obtains the reference parameter of the reference image selected by the user, and sets the obtained reference parameter as the initial value of the model parameter of the input image.

When a plurality of reference images are displayed at S805, and more than one reference image is selected by the user at S806, the initial value of the model parameter may be determined based on a combined parameter value, which is obtained by combining a plurality of reference parameters as described above referring to S206 of FIG. 2.

At S810, when there is no reference image that is similar to the input image, the initial parameter determiner 707 randomly determines the initial value of the model parameter.

At S808, the parameter update device 708 updates the initial value of the model parameter so as to match the probability density distribution in the feature space of the input image, using any desired known method.

At S809, the clustering device 704 clusters the probability density distribution in the feature space using the model parameter, and outputs the clustering result through the result output 705.

As described above, in this embodiment, in prior to determining the model parameter of the similar data set that has been appropriately clustered, the information processing apparatus of FIG. 7 displays a plurality of candidate similar data sets to the user, and allows the user to select one or more of the plurality of candidate similar data sets. Accordingly, the clustering result as desired by the user can be obtained, with improved accuracy and stability.

In any one of the above-described example embodiments, in order to cluster an input data set, a reference data set, which is similar to the input data set, is searched through a storage device that stores a plurality of reference data sets each of which is previously clustered. The initial value of model parameter of the input data set is determined based on a model parameter used for clustering the reference data set. The initial value is further modified so as to match the input data set. By using the modified initial value, a clustering result of the input data set is obtained.

The clustering method in any one of the above-described example embodiments uses a model parameter of a reference data set that is similar to an input data set. Rather than randomly setting the number of classes, the number f classes can be appropriately set based on the clustering result of the reference data set. More specifically, the model parameter of the reference data set that has been appropriately clustered is used to cluster the input data set, thus improving the accuracy in setting the number of classes.

Further, it is assumed that the value of model parameter is similar between the reference data set and the input data set. Rather than randomly setting the initial value of model parameter of the input data set, the model parameter of the reference data set that has been appropriately clustered is used as the initial value of model parameter of the input data set. Since the reference data set is not exactly the same as the input data set, the initial value of model parameter may be modified, or updated, so as to match the actual input data set, thus further improving the accuracy.

Furthermore, setting of the initial value of the model parameter of the input data set based on the model parameter of the reference data set, may be repeated for more than one reference data set. Compared to operation of randomly setting the initial value, the clustering result may be repeatedly used, thus improving the reproducibility.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Further, any of the above-described devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. For example, the storage medium storing a software program code that executes any one of the above-described clustering method may be installed onto a memory of a system or an apparatus, such as the information processing apparatus. The processor, such as a central processing unit (CPU) or a microprocessing unit (MPU), of the system or apparatus loads the program code from the memory to execute any one of the above-described clustering methods. Examples of storage mediums include, but are not limited to, flexible disk, hard disk, optical discs, magneto-optical discs, magnetic tapes, nonvolatile memory cards, ROM (read-only-memory), etc. Further, in executing the software program code to perform any one of the above-described clustering methods, the processor may cause an operation system (OS) to perform a part or entire operation according to the program code. The program code, which may be read out from the memory of the system or apparatus, may be written onto a memory of a function extension board or unit provided for the processor of the system or apparatus. In such case, a processor such as a CPU of the function extension board or unit may perform a part or entire operation according to the program code. Alternatively, the program code may be downloaded via a network, such as from a server.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

Further, as long as the clustering program is installed, a structure of the information processing apparatus is not limited to, for example, the general-purpose computer. For example, the information processing apparatus includes an image processing apparatus such as a multifunctional printer, a projector, a portable device such as a mobile phone or a digital camera, etc.

In one example, the present invention may reside in an information processing apparatus, which clusters an input data set on a feature space, using a mixture distribution model in which a plurality of distributions is overlapped. The information processing apparatus includes: a storage area that stores, for each of a plurality of reference data sets that is previously clustered, a reference parameter used for clustering the reference data set, the reference parameter being a model parameter of mixture distribution; a search device that searches the storage area to obtain the reference parameter of at least one reference data set that is similar to the input data set; an initial parameter determiner that determines an initial value of a model parameter of mixture distribution of the input data set, based on the reference parameter of the at least one reference data set; a parameter update device that modifies the initial value of the model parameter of mixture distribution of the input data set, so as to match a probability density distribution of the input data set to generate an updated initial value; and a clustering device that clusters the probability density distribution of the input data set on a feature space of the input data set, using the updated initial value of the model parameter of mixture distribution.

What is claimed is:

1. An information processing apparatus that clusters an input data set, comprising:
a memory having stored thereon (i) a plurality of reference data sets that were previously clustered, the plurality of reference data sets correspond to a plurality of reference images, and (ii) a first reference parameter for clustering a first reference data set of the plurality of reference data sets, the first reference data set of the plurality of reference data sets including a plurality of clusters corresponding to a region of a respective one of the plurality of reference images, the first reference parameter being a model parameter of mixture distribution, the first reference parameter corresponding to at least one of a number of clusters in the first reference data set, and a centroid of data points in each of the plurality of clusters; and at least one processor configured to execute computer readable instructions to, search the memory to obtain the first reference parameter of at least one of the plurality of reference data sets that is similar to the input data set, determine an initial value of the model parameter of mixture distribution of the input data set by combining (a) the first reference parameter of the first reference data set with (b) a second reference parameter of a second reference data set based on similarity between the input data set and the combined first and second reference data sets, at least one of the first reference parameter and the second reference parameter are obtained from the plurality of reference images, modify the initial value of the model parameter of mixture distribution of the input data set to match a probability density distribution of the input data set to generate an updated initial value, and cluster the probability density distribution of the input data set on a feature space of the input data set using the updated initial value of the model parameter of mixture distribution.

2. The information processing apparatus of claim 1, wherein the first reference parameter and the second reference parameter included in a plurality of reference parameters, and the at least one processor is further configured to execute the computer readable instructions to, obtain the plurality of reference parameters based on a degree of similarity between the input data set and the plurality of reference data sets as the at least one of the plurality of reference data sets is similar to the input data set, and combine the plurality of reference parameters based on the degree of similarity to determine the initial value of the model parameter of mixture distribution of the input data set.

3. The information processing apparatus of claim 2, wherein the at least one processor is further configured to execute the computer readable instructions to, calculate the degree of similarity based on a feature of the input data set and a feature of the plurality of reference data sets, and search the at least one of the plurality of reference data sets based on the degree of similarity.

4. The information processing apparatus of claim 3, wherein the feature of the input data set and the feature of the plurality of reference data sets differs from a feature for clustering the input data set.

5. The information processing apparatus of claim 4, wherein the feature for calculating the input data set and the feature of the plurality of reference data sets includes at least one of (i) a feature indicating a shape information of at least one data point in the plurality of reference data sets and (ii) a feature indicating a texture information of the at least one data point in the plurality of reference data sets.

6. The information processing apparatus of claim 4, wherein the feature for clustering the input data set includes a feature indicating a color information of at least one data point in the plurality of reference data sets.

7. The information processing apparatus of claim 1, wherein the model of mixture distribution is a Gaussian mixture distribution model.

8. The information processing apparatus of claim 1, wherein the input data set is an image, and each data point in the input data set is a pixel or a set of a plurality of pixels in the image.

9. A method of clustering an input data set, comprising:

storing, in a memory, for each of a plurality of reference data sets corresponding to a respective one of the plurality of reference images that were previously clustered, a first reference parameter for clustering a first reference data set of the plurality of reference data sets, the reference data set of the plurality of reference data sets including a plurality of clusters corresponding to a region of the respective one of the plurality of reference images, the first reference parameter being a model parameter of mixture distribution, the first reference parameter corresponding to at least one of a number of clusters in the first reference data set, and a centroid of data points in each of the plurality of clusters;

searching, using at least one processor, the memory to obtain the first reference parameter of at least one of the plurality of reference data sets that is similar to the input data set;

determining, using the at least one processor, an initial value of the model parameter of mixture distribution of the input data set by combining the first reference parameter of the first reference data set with a second reference parameter of a second reference data set based on similarity between the input data set and the combined first and second reference data sets, the first reference parameter and the second reference parameter included in a plurality of reference parameters, at least one of the first reference parameter and the second reference parameter are obtained from the plurality of reference images;

modifying, using the at least one processor, the initial value of the model parameter of mixture distribution of the input data set to match a probability density distribution of the input data set to generate an updated initial value; and clustering, using the at least one processor, the probability density distribution of the input data set on a feature space of the input data set using the updated initial value of the model parameter of mixture distribution.

10. The method of claim 9, further comprising:

obtaining, using the at least one processor, the plurality of reference parameters based on a degree of similarity between the input data set and the plurality of reference data sets as the at least one of the plurality of reference data sets is similar to the input data set; and combining, using the at least one processor, the plurality of reference parameters based on the degree of similarity to determine the initial value of the model parameter of mixture distribution of the input data set.

11. The method of claim 10, further comprising:

calculating, using the at least one processor, the degree of similarity based on a feature of the input data set and a feature of the plurality of reference data sets; and searching, using the at least one processor, the at least one of the plurality of reference data sets based on the degree of similarity.

12. The method of claim 11, wherein the calculating, using the at least one processor, the feature of the input data set and the feature of the plurality of reference data sets differs from a feature for clustering the input data set.

13. The method of claim 12, wherein the calculating, using the at least one processor, the feature of the input data set and the feature of the plurality of reference data sets includes at least one of (i) a feature indicating a shape information of at least one data point in the plurality of reference data sets and (ii) a feature indicating a texture information of the at least one data point in the plurality of reference data sets.

14. The method of claim 12, wherein the calculating, using the at least one processor, the feature for clustering the input data set includes a feature indicating a color information of at least one data point in the plurality of reference data sets.

15. The method of claim 9, wherein the storing in the memory of the first reference parameter is the model of mixture distribution which is a Gaussian mixture distribution model.

16. The method of claim 9, wherein the input data set is an image, and each data point in the input data set is a pixel or a set of a plurality of pixels in the image.

17. A non-transitory computer readable recording medium having computer readable instructions stored thereon, that when executed by at least one processor, configure the at least one processor to:
store, in a memory, for each of a plurality of reference data sets corresponding to a respective one of the plurality of reference images that were previously clustered, a first reference parameter for clustering a first reference data set of the plurality of reference data sets, the first reference data set of the plurality of reference data sets including a plurality of clusters corresponding to a region of the respective one of the plurality of reference images, the first reference parameter being a model parameter of mixture distribution, the first reference parameter corresponding to at least one of a number of clusters in the first reference data set, and a centroid of data points in each of the plurality of clusters;
search the memory to obtain the first reference parameter of at least one of the plurality of reference data sets that is similar to an input data set;
determine an initial value of the model parameter of mixture distribution of the input data set by combining the first reference parameter of the first reference data set with a second reference parameter of a second reference data set based on similarity between the input data set and the combined first and second reference data sets, at least one of the first reference parameter and the second reference parameter are obtained from the plurality of reference images;
modify the initial value of the model parameter of mixture distribution of the input data set to match a probability density distribution of the input data set to generate an updated initial value; and
cluster the probability density distribution of the input data set on a feature space of the input data set using the updated initial value of the model parameter of mixture distribution.

18. The information processing apparatus of claim 1, wherein the at least one processor is further configured to execute the computer readable instructions to use an EM algorithm to modify the initial value.

19. The method of claim 9, wherein the modifying, using the at least one processor, of the initial value is based on an EM algorithm.

20. The non-transitory computer readable recording medium of claim 17, wherein the at least one processor is further configured to execute the computer readable instructions to use an EM algorithm to modify the initial value.

* * * * *